(12) United States Patent
Patterson et al.

(10) Patent No.: US 6,912,635 B2
(45) Date of Patent: Jun. 28, 2005

(54) DISTRIBUTING WORKLOAD EVENLY ACROSS STORAGE MEDIA IN A STORAGE ARRAY

(75) Inventors: Brian Patterson, Boise, ID (US); Jonathan Condel, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 256 days.

(21) Appl. No.: 10/140,968

(22) Filed: May 8, 2002

(65) Prior Publication Data
US 2003/0212872 A1 Nov. 13, 2003

(51) Int. Cl.[7] .............................................. G06F 12/00
(52) U.S. Cl. ...................... 711/165; 711/111; 711/112; 711/114; 711/156
(58) Field of Search ................................ 711/165, 156, 711/111, 112, 114

(56) References Cited

U.S. PATENT DOCUMENTS

| | | | | |
|---|---|---|---|---|
| 5,392,244 A | * | 2/1995 | Jacobson et al. | 711/114 |
| 5,542,065 A | * | 7/1996 | Burkes et al. | 711/114 |
| 5,574,881 A | * | 11/1996 | Yasuoka et al. | 711/112 |
| 5,584,018 A | * | 12/1996 | Kamiyama | 711/165 |
| 5,664,187 A | * | 9/1997 | Burkes et al. | 707/205 |
| 6,052,759 A | * | 4/2000 | Stallmo et al. | 711/114 |
| 6,233,607 B1 | * | 5/2001 | Taylor et al. | 709/217 |
| 6,233,653 B1 | * | 5/2001 | Abe et al. | 711/113 |
| 6,314,503 B1 | * | 11/2001 | D'Errico et al. | 711/165 |
| 6,611,726 B1 | * | 8/2003 | Crosswhite | 700/99 |
| 2002/0103969 A1 | * | 8/2002 | Koizumi et al. | 711/114 |
| 2002/0169657 A1 | * | 11/2002 | Singh et al. | 705/10 |

FOREIGN PATENT DOCUMENTS

EP          1030305 A2  *  8/2000    ......... G11B/27/00

* cited by examiner

*Primary Examiner*—Stephen Elmore (57) ABSTRACT

A system and methods employ a redistribution module to predict whether there is data stored in an arrayed storage device that is likely to be data that will be highly accessed in the future. The redistribution module locates high-access data on one or more storage components within the array and redistributes it evenly across all storage components in the array so that no single storage component contains a disproportionate amount of the high-access data. Redistributing high-access data evenly across all storage components (e.g., disks) in a storage array helps prevent I/O (input/output) bottlenecking at any single storage component in the array. I/Os are serviced in a more parallel manner which increases the overall performance of the storage array.

33 Claims, 5 Drawing Sheets

DISTRIBUTING WORKLOAD EVENLY ACROSS STORAGE MEDIA IN A STORAGE ARRAY

TECHNICAL FIELD

The present disclosure relates to arrayed storage devices, and more particularly, to redistributing heavily accessed data from busy storage media to more idle storage media within such devices to provide an even workload distribution.

BACKGROUND

Arrayed storage devices, such as RAID (redundant array of independent disks) disk arrays, are data storage devices that are intended to provide better performance and reliability than single media storage devices, such as individual hard disks. The performance advantage of arrayed storage devices over single storage devices comes from their ability to service read or write requests in parallel across numerous disks (i.e. in a RAID device) rather than having to service numerous read or write requests in serial on a single disk. On average, a RAID device can service more inputs and outputs (I/Os) in a given amount of time than a single disk can.

However, the degree of performance advantage achievable in an arrayed storage device over a single storage device is directly related to the degree to which I/Os are evenly distributed across the disks in the arrayed device (i.e. in a RAID device). Therefore, under circumstances in which numerous host computer I/O requests are all directed at data stored on disk #1, for example, of a 20 disk array, the 20 disk array provides no advantage over a single storage device. The heavily accessed data stored on disk #1 creates a bottleneck at disk drive #1, and any benefit to the host computer in using the arrayed storage device over a single storage device is significantly reduced with respect to the heavily accessed data.

Data striping is a technique used in RAID devices to distribute data and I/Os evenly across the array of disk drives in order to maximize the number of simultaneous I/O operations that can be performed by the array. Data striping concatenates multiple disk drives into one logical storage unit and partitions each drive's storage space into stripes that can be as small as one sector (512 bytes) or as large as several megabytes. The stripes are interleaved in a round-robin fashion so that the combined space is composed alternately of stripes from each drive. The type of application environment determines whether large or small data stripes are more beneficial. In an I/O intensive environment, performance is optimized when stripes are large enough that a record can potentially fall within one stripe. In data intensive environments, smaller stripes (typically one 512-byte sector in length) are better because they permit faster access to longer records.

Although data striping generally provides more parallel access to data stored on an arrayed storage device, it does not solve the problem of bottlenecking that can occur at a single disk drive when particular data is being heavily accessed on that drive. Data striping is blind with respect to whether or not data is or will be heavily accessed data. Furthermore, once the data is "striped", it remains stored in the same location on the same disk. Therefore, if circumstances arise in which a host computer bombards a particular disk drive in an array of disks with I/O requests pertaining to certain data, a bottleneck will occur at the particular disk drive regardless of the fact that data striping was used to initially store the data.

Accordingly, the need exists for a way to determine if there is data stored in an arrayed storage device that is likely to be data that will be heavily accessed and to distribute this data across the storage components within the array such that the workload is more evenly distributed and I/O operations occur in a more parallel manner.

SUMMARY

A system and methods employ a redistribution module that determines whether there is data stored in an arrayed storage device that is likely to be highly accessed data. The redistribution module locates the high-access data on one or more storage components within the array and redistributes it across all of the storage components in the array so that no single storage component contains a disproportionate amount of the high-access data.

In one embodiment, a redistribution module in a storage array device is configured to compile workload information that indicates workload levels for each of the storage components in the storage array. The redistribution module implements a predictive algorithm to analyze the workload information and predict whether any data stored on the storage components is high-access data that is likely to be heavily accessed in the future. Data deemed by the predictive algorithm to be high-access data is then located on the appropriate storage component(s) and redistributed evenly across all storage components within the storage array.

In another embodiment, a redistribution module in a storage array device is configured to access foreknowledge information that has been previously entered into the array's memory. The foreknowledge information indicates that particular data stored in the array will be heavily accessed in the future. The redistribution module locates this high-access data and redistributes it evenly across all storage components within the storage array.

BRIEF DESCRIPTION OF THE DRAWINGS

The same reference numbers are used throughout the drawings to reference like components and features.

DETAILED DESCRIPTION

A system and methods employ a redistribution module to predict whether there is data stored in an arrayed storage device that is likely to be data that will be highly accessed in the future. The redistribution module locates high-access data on one or more storage components within the array and redistributes it evenly across all storage components in the array so that no single storage component contains a disproportionate amount of the high-access data. Redistributing high-access data evenly across all storage components (e.g., disks) in a storage array helps prevent I/O (input/output) bottlenecking at any single storage component in the array. I/Os are serviced in a more parallel manner which increases the overall performance of the storage array.

Figure 1:
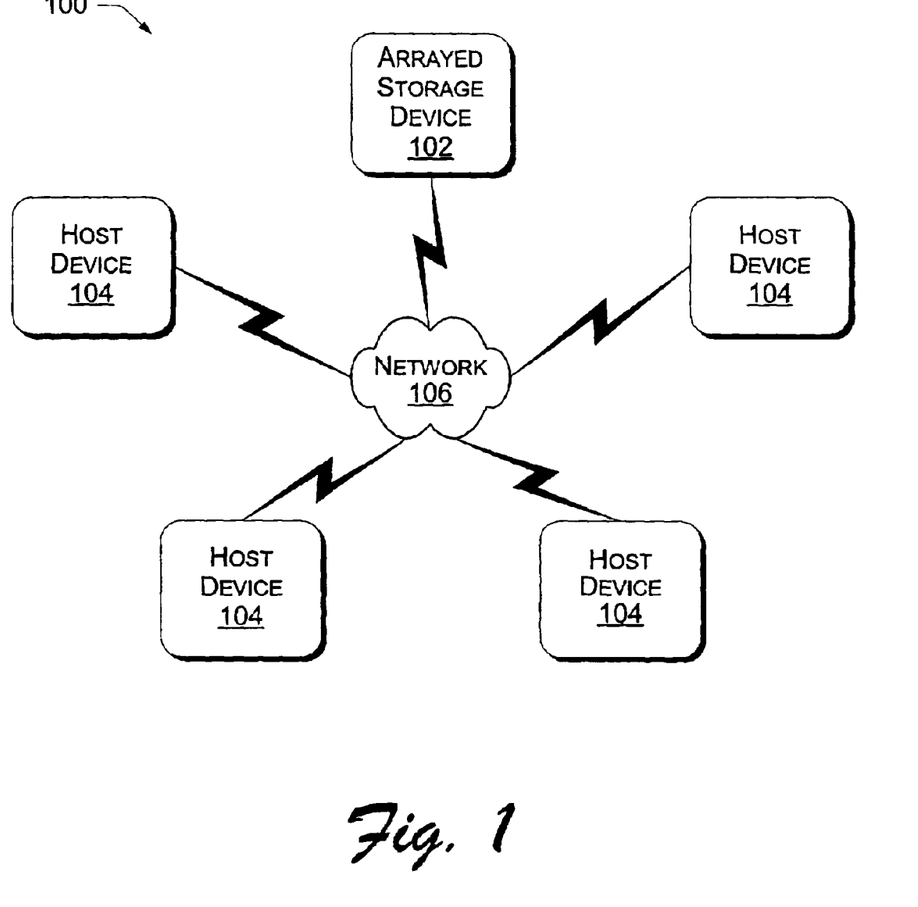
FIG. 1 illustrates a system environment that is suitable for predicting if there is high-access data stored on an arrayed storage device and for redistributing the high-access data evenly across storage components within the arrayed device.

Exemplary System Environment for Predicting High-Access Data and for Redistributing High-Access Data Evenly Across Storage Components Within an Arrayed Storage Device FIG. 1 illustrates a system environment 100 suitable for predicting which data stored in an arrayed storage device 102 may be heavily accessed in the future and for redistributing this data evenly across all the storage components of the arrayed device 102. Throughout this disclosure, the phrase "high-access data" is used to indicate data, code or other such information stored in an arrayed storage device 102 that is more heavily accessed by a host device 104 (or host devices 104) than other data stored in the arrayed storage device 102. "Arrayed storage device" 102 and its variations, such as "storage array device", "array", "virtual array" and the like, are used throughout this disclosure to refer to a plurality of storage components/devices being operatively coupled for the general purpose of increasing storage performance. Storage performance goals typically include mass storage, low cost per stored megabyte, high input/output performance, and high data availability through redundancy and fault tolerance. Storage components/devices operatively coupled within such arrays 102 can include magnetic disk drives, tape drives, optical read/write disk drives, solid state disks and the like. Such storage components are well known in the art of data storage technology.

The system environment 100 of FIG. 1 includes arrayed storage device 102 operatively coupled to host device(s) 104 through network 106. The network connection 106 can include, for example, a LAN (local area network), a WAN (wide area network), an intranet, the Internet, a fiber optic cable link, a direct connection, or any other suitable communication link. Host device(s) 104 can be implemented as a variety of general purpose computing devices including, for example, a personal computer (PC), a laptop computer, a server, a Web server, and other devices configured to communicate with arrayed storage device 102.

This disclosure is applicable to various types of arrayed storage devices 102 that employ a range of storage components as generally discussed above. In addition, arrayed storage devices 102 as disclosed herein are virtual storage array devices that include a virtual memory storage feature. Thus, the virtual storage arrays 102 presently disclosed provide a layer of address mapping indirection between host 104 addresses and the actual physical addresses where host 104 data is stored within the virtual storage array 102. Address mapping indirection uses pointers that make it possible to move data around to different physical locations within the array 102 in a way that is transparent to the host 104.

As an example, a host device 104 may store data at host address $H_5$ which the host 104 thinks is pointing to the physical location of disk #2, sector #56, on virtual storage array 102. However, the virtual storage array 102 may move the host data to an entirely different physical location (e.g., disk #9, sector #27) within the array 102 and update a pointer (i.e., layer of address indirection) so that it always points to the host data. The host 104 continues accessing the data at the same host address $H_5$, without having to know that the data has actually been moved to a new physical location within the virtual storage array 102.

Virtual storage arrays are known in the art and are currently implemented, for example, in hierarchical or multi-level RAID systems. Hierarchical RAID systems employ two or more different RAID levels that coexist on the same set of disks within an array. Generally, different RAID levels provide different benefits of performance versus storage efficiency. For example, RAID level 1 provides low storage efficiency because disks are mirrored for data redundancy, while RAID level 5 provides higher storage efficiency by creating and storing parity information on one disk that provides redundancy for data stored on a number of disks. However, RAID level 1 provides faster performance under random data writes than RAID level 5 because RAID level 1 does not require the multiple read operations that are necessary in RAID level 5 for recreating parity information when data is being updated (i.e. written) to a disk.

Hierarchical RAID systems use virtual storage as described above to facilitate the migration (i.e., relocation) of data between different RAID levels within a multi-level array in order to maximize the benefits of performance and storage efficiency that the different RAID levels offer. Therefore, data is migrated to and from a particular location on a disk in a hierarchical RAID array on the basis of which RAID level is operational at that location. In addition, hierarchical RAID systems determine which data to migrate between RAID levels based on which data in the array is the most recently or least recently written or updated data. Data that is written or updated least recently is migrated to a lower performance, higher storage-efficient RAID level, while data that is written or updated the most recently is migrated to a higher performance, lower storage-efficient RAID level. This process is similar to how a cache management system operates in a computer.

Like hierarchical RAID systems, the virtual storage array device(s) 102 as presently disclosed in the system environment 100 of FIG. 1 employ virtual storage concepts to facilitate data migration within the array 102. However, as described in more detail below with respect to particular embodiments, virtual storage array device(s) 102 migrate particular data evenly across all storage components (e.g., disks) within an array 102 on the basis of storage component workloads.

Figure 2:
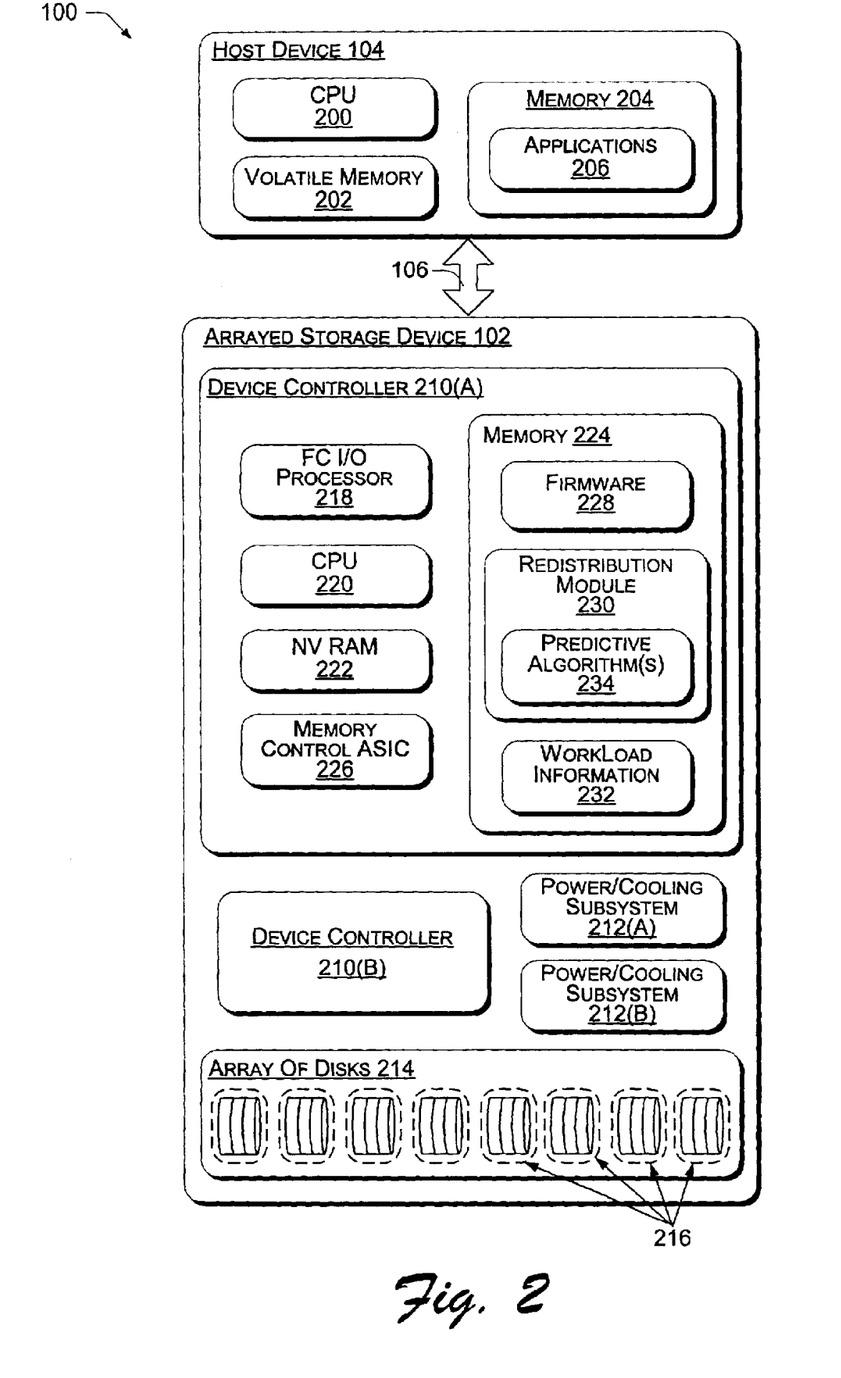
FIG. 2 is a block diagram illustrating in greater detail, a particular embodiment of a host computer device and an arrayed storage device as might be implemented in the system environment of FIG. 1.

Exemplary System Embodiments for Predicting High-Access Data and for Redistributing High-Access Data Evenly Across Storage Components Within an Arrayed Storage Device FIG. 2 is a block diagram illustrating a particular embodiment of a host computer device 104 and an arrayed storage device 102 as might be implemented in the system environment 100 of FIG. 1. The arrayed storage device 102 of FIG. 1 is embodied as a virtual RAID (redundant array of independent disks) device. Host device 104 is embodied generally as a computer such as a personal computer (PC), a laptop computer, a server, a Web server, or other computer device configured to communicate with RAID device 102.

Host device 104 typically includes a processor 200, a volatile memory 202 (i.e., RAM), and a nonvolatile memory 204 (e.g., ROM, hard disk, floppy disk, CD-ROM, etc.). Nonvolatile memory 204 generally provides storage of computer readable instructions, data structures, program modules and other data for host device 104. Host device 104 may implement various application programs 206 stored in memory 204 and executed on processor 200 that create or otherwise access data to be transferred via network connection 106 to RAID device 102 for storage and subsequent retrieval. Such applications 206 might include software programs implementing, for example, word processors, spread sheets, browsers, multimedia players, illustrators, computer-aided design tools and the like. Thus, host device 104 provides a regular flow of data I/O requests to be serviced by virtual RAID device 102.

RAID devices 102 are generally designed to provide continuous data storage and data retrieval for computer devices such as host device(s) 104, and to do so regardless of various fault conditions that may occur. Thus, a RAID device 102 typically includes redundant subsystems such as controllers 210(A) and 210(B) and power and cooling subsystems 212(A) and 212(B) that permit continued access to the disk array 102 even during a failure of one of the subsystems. In addition, RAID device 102 typically provides hot-swapping capability for array components (i.e. the ability to remove and replace components while the disk array 102 remains online) such as controllers 210(A) and 210(B), power/cooling subsystems 212(A) and 212(B), and disk drives 216 in the array of disks 214.

Controllers 210(A) and 210(B) on RAID device 102 mirror each other and are generally configured to redundantly store and access data on disk drives 216. Thus, controllers 210(A) and 210(B) perform tasks such as attaching validation tags to data before saving it to disk drives 216 and checking the tags to ensure data from a disk drive 216 is correct before sending it back to host device 104. Controllers 210(A) and 210(B) also tolerate faults such as disk drive 216 failures by recreating data that may be lost during such failures.

Controllers 210 on RAID device 102 typically include I/O processor(s) such as FC (fiber channel) I/O processor(s) 218, main processor(s) 220, nonvolatile (NV) RAM 222, nonvolatile memory 224 (e.g., ROM), and one or more ASICs (application specific integrated circuits) such as memory control ASIC 226. NV RAM 222 is typically supported by a battery backup (not shown) that preserves data in NV RAM 222 in the event power is lost to controller(s) 210. Nonvolatile memory 224 generally provides storage of computer readable instructions, data structures, program modules and other data for RAID device 102.

Accordingly, nonvolatile memory 224 includes firmware 228, data redistribution module 230, and workload information 232. Firmware 228 is generally configured to execute on processor(s) 220 and support normal disk array 102 operations. Firmware 228 is also typically configured to handle various fault scenarios that may arise in RAID device 102. In the current embodiment of FIG. 2, redistribution module 230 is configured to execute on processor(s) 220 and compile and analyze workload information 232 to predict and redistribute high-access data evenly across disk drives 216 as more fully discussed herein below.

FC I/O processor(s) 218 receives data and commands from host device 104 via network connection 106. FC I/O processor(s) 218 communicate with main processor(s) 220 through standard protocols and interrupt procedures to transfer data and commands to redundant controller 210(B) and generally move data between NV RAM 222 and various disk drives 216 to ensure that data is stored redundantly.

Memory control ASIC 226 generally controls data storage and retrieval, data manipulation, redundancy management, and the like through communications between mirrored controllers 210(A) and 210(B). Memory controller ASIC 226 handles tagging of data sectors being striped to disks 216 in the array of disks 214 and writes parity information across the disk drives 216. In general, the functions performed by ASIC 226 might also be performed by firmware or software executing on general purpose microprocessors. Data striping and parity checking are well-known to those skilled in the art. Memory control ASIC 226 also typically includes internal buffers (not shown) that facilitate testing of memory 224 to ensure that all regions of mirrored memory (i.e. between mirrored controllers 210(A) and 210(B)) are compared to be identical and checked for ECC (error checking and correction) errors on a regular basis. Memory control ASIC 226 notifies processor 220 of these and other errors it detects. Firmware 228 is configured to manage errors detected by memory control ASIC 226 in a tolerant manner which may include, for example, preventing the corruption of array 102 data or working around a detected error/fault through a redundant subsystem to prevent the array 102 from crashing.

As indicated above, the current embodiment of a virtual storage array 102 as illustrated by the virtual RAID device 102 in FIG. 2, includes redistribution module 230 and workload information 232. Redistribution module 230 is configured to perform several tasks during the normal operation of RAID device 102. One of the tasks redistribution module 230 performs is that of monitoring disk workloads and compiling state information about the workload of each disk in the array 102. Redistribution module 230 stores this information as workload information 232. Workload information 232 generally includes information indicating the frequency with which disks 216 in array 102 are servicing data I/O requests from host device(s) 104. Workload information 232 additionally includes information regarding the exact disk locations (e.g., addresses, sectors) being accessed to service the host device 104 I/O requests.

In addition to compiling and storing data as workload information 232, redistribution module 230 can use the workload information 232 to determine which disks 216 in array 102 are the least "busy" disks and the most "busy" disks. Furthermore, redistribution module 230 analyzes the data stored in workload information 232 through predictive algorithm(s) 234 in order to predict future workload requirements. Predictive algorithm 234 is illustrated in FIG. 2 as a component of redistribution module 230, but it might also be a separate module stored in memory 224 and called upon as necessary by redistribution module 230 to analyze the data stored in workload information 232. Predictive algorithm(s) 234 can include any algorithm that is generally configured to manipulate past state information about array 102 workloads to predict future workload requirements. More specifically, predictive algorithm(s) 234 manipulate information compiled in workload information 232 to determine which data on disks 216 is likely to be the most heavily accessed data in the future. Examples of predictive algorithm(s) 234 include time-series forecasting (TSF) algorithms and most-frequently used (MFU) algorithms.

After predictive algorithm 234 determines whether such "high-access data" is present on any of the disks 216, redistribution module 230 accesses the high-access data and redistributes (i.e., migrates) it evenly across all the disks 216 in the array 102. Thus, disks 216 that were previously very "busy" servicing host 104 I/O requests due to data which is high-access data, will carry less of the workload when the high-access data is desired by a host 104 in the future. In addition, disks 216 that were previously idle or less active than "busy disks", will carry a fair share of the workload generated by a host accessing such high-access data in the future.

Redistribution typically includes taking high-access data from a "busy disk" or disks, and migrating it to less busy disks. Redistribution may also include leaving a certain amount of high-access data on the busy disk as part of the migration process. There are various known methods by which a known amount of data can be evenly distributed among various storage components (e.g., disks).

In addition to the above described tasks, redistribution module 230 monitors the overall utilization rate of virtual RAID device 102 in order to determine the least disruptive time to migrate high-access data evenly across disks 216. Redistribution module 230 uses the utilization rate of virtual storage array 102 to make the migration of high-access data a background task that does not interfere with foreground tasks related to servicing host 104 requests. If performed as a foreground task, data migration might otherwise defeat the general purpose of reducing the overall time to service host 104 I/O requests.

Moreover, although data migration can be performed as an "idle" activity during a least disruptive time, it can also be performed as part of a data placement algorithm used by the array while processing high-priority or host 104 I/O requests. For example, when a new data write is sent to the array 102, the array controller 210 can determine that the new write is random rather than sequential. The nature of random I/O is such that the principal of locality applies to it in terms of time. That is, if a new write is written or accessed at time T, it will likely be written or accessed again soon after time T. Therefore, upon determining that an I/O is random, the array controller 210 can send the data to individual disks 216 based on which disks are less "busy" as discussed herein above.

There are various ways of monitoring the utilization rate of a virtual RAID device 102. As an example, an optical fiber channel (not shown) is typically used to couple controllers 210 to array of disks 214. The optical fiber channel may have a maximum data transfer rate of 100 megabytes per second. A decrease in the utilization rate of the optical fiber channel generally indicates that host 104 I/O requests have diminished, leaving excess capacity on the optical fiber channel that can be used for other tasks without adversely impacting host I/O requests. Thus, redistribution module 230 monitors the optical fiber channel to determine when the utilization rate drops below a certain threshold percent of its overall capacity, at which point it initiates background tasks such as migrating high-access data evenly across disks 216. As indicated above, there are other components that might be monitored to indicate the general utilization rate of virtual RAID device 102. Using the optical fiber channel is just one example.

Figure 3:
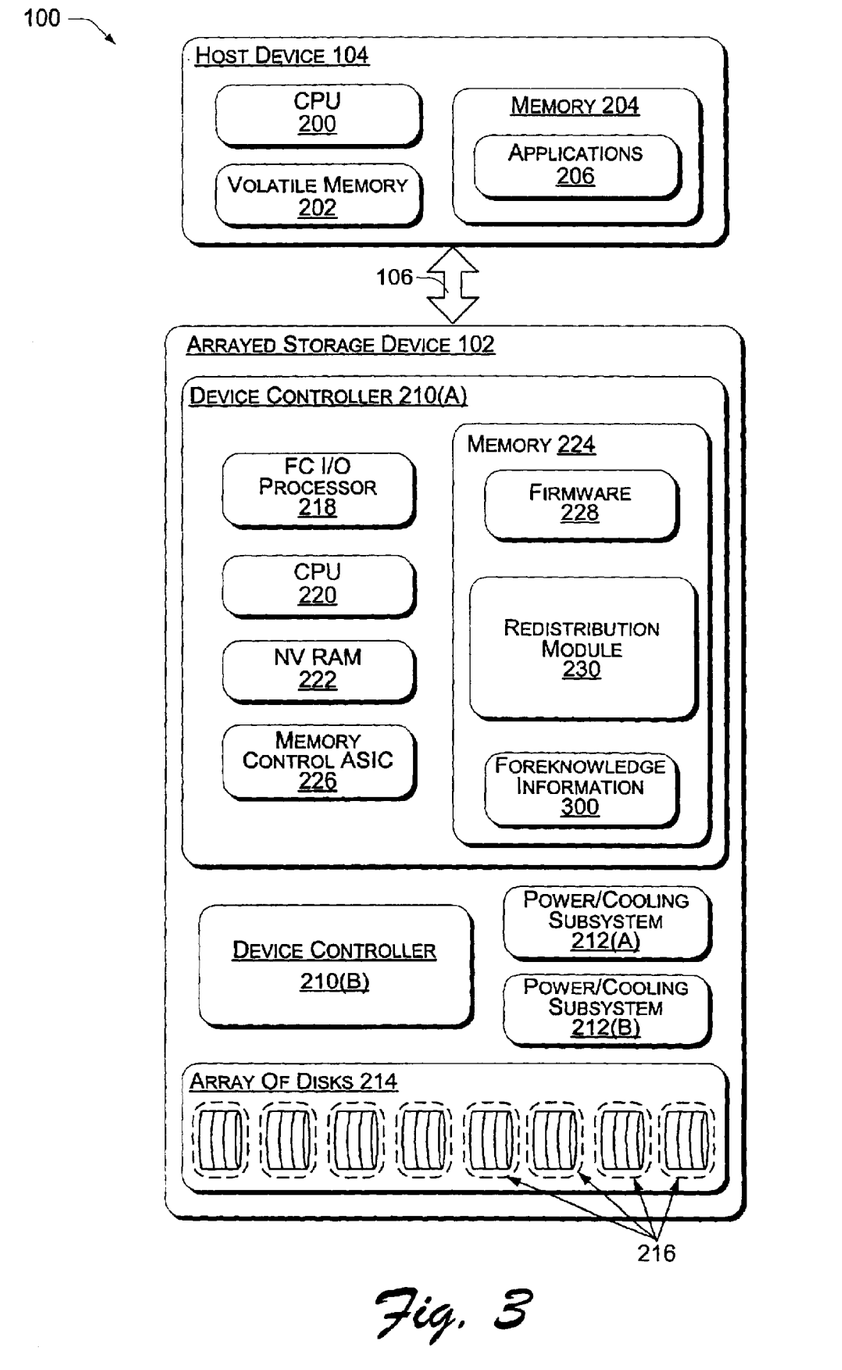
FIG. 3 is a block diagram illustrating in greater detail, another embodiment of a host computer device and an arrayed storage device as might be implemented in the system environment of FIG. 1.

FIG. 3 is a block diagram illustrating another particular embodiment of a host computer device 104 and an arrayed storage device 102 as might be implemented in the system environment 100 of FIG. 1. Like the embodiment of FIG. 2, the arrayed storage device 102 is embodied as a virtual RAID device, and the host device 104 is embodied generally as a computer device. Host device 104 is configured as described above with respect to the FIG. 2 embodiment. Virtual RAID device 102 is also configured as described above with respect to the FIG. 2 embodiment, except that redistribution module 230 no longer includes predictive algorithm(s) 234 and the workload information module 232 is replaced with a foreknowledge information module 300 stored in memory 224.

In the FIG. 3 embodiment, redistribution module 230 performs the same general tasks as described in the prior embodiment of FIG. 2. However, redistribution module 230 is configured to recognize that foreknowledge information 300 has been entered into the RAID device 102 that specifies which data is going to be heavily accessed data in the future. Under certain circumstances, a user may have foreknowledge information that particular data being stored in the RAID device 102 will be high-access data. Such information can be entered into the array 102 and stored as foreknowledge information 300. Redistribution module 230 is configured to recognize the foreknowledge information 300 and respond by locating and redistributing (migrating) the identified high-access data evenly across the disks 216 of the array 102. The data migration process is the same as that described in the prior embodiment of FIG. 2.

Exemplary Methods for Predicting High-Access Data and for Redistributing High-Access Data Evenly Across Storage Components Within an Arrayed Storage Device Example methods for predicting which data stored in an arrayed storage device 102 may be heavily accessed in the future and for redistributing this high-access data evenly across all the storage components of an arrayed device 102 will now be described with primary reference to FIGS. 4 and 5. The methods apply generally to the exemplary embodiments of system 100 as discussed above with respect to FIGS. 1–3.

Figure 4:
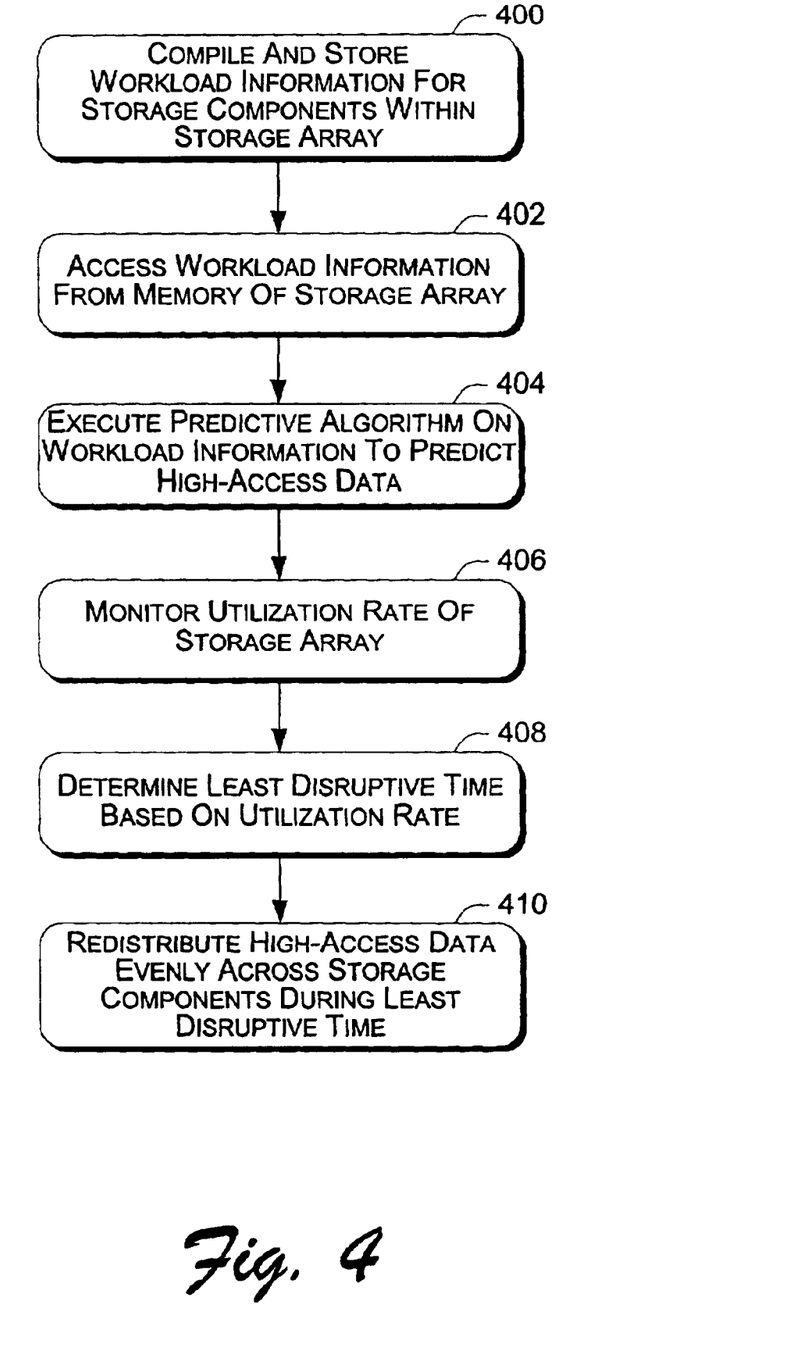
FIG. 4 is a flow diagram illustrating an example method of predicting if there is high-access data stored on an arrayed storage device and of redistributing the high-access data evenly across storage components within the arrayed device.
Figure 5:
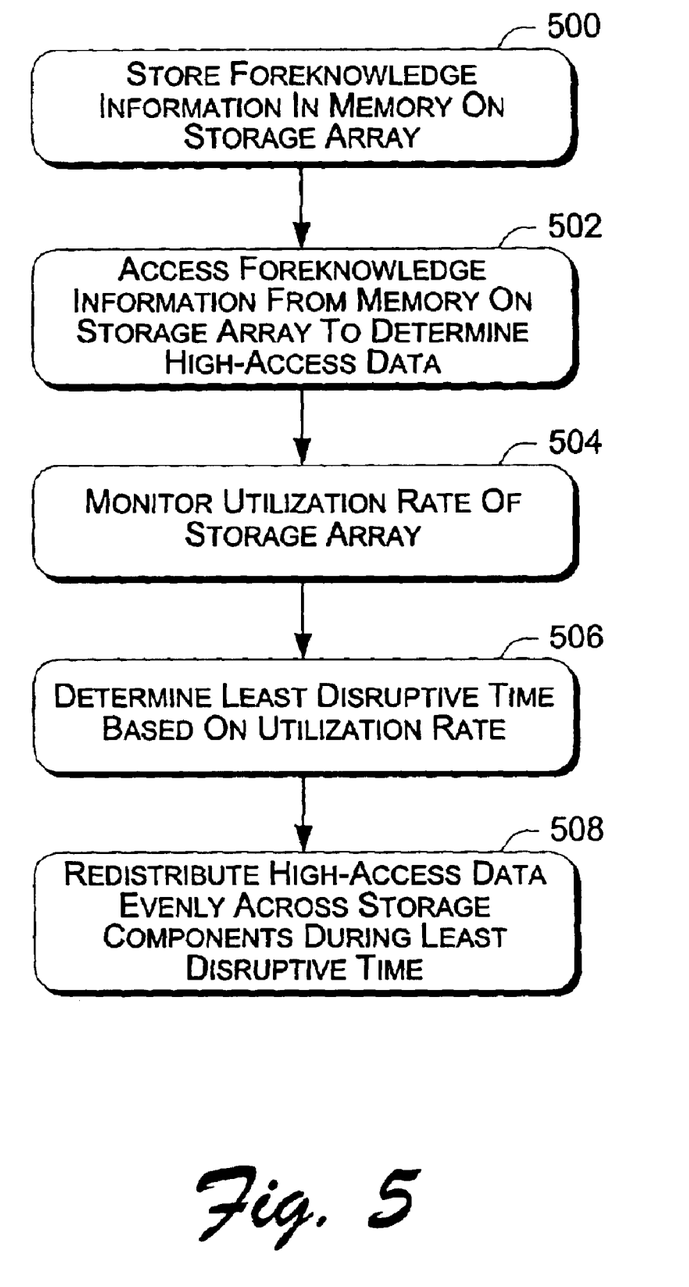
FIG. 5 is a flow diagram illustrating an alternate example method of predicting if there is high-access data stored on an arrayed storage device and of redistributing the high-access data evenly across storage components within the arrayed device.

FIGS. 4 and 5 are flow diagrams that show examples of general methods for predicting or determining that there is data stored on one or more storage components within an arrayed storage device 102 that is likely to be heavily accessed data. The methods also generally illustrate how such high-access data can be distributed evenly across the storage components (e.g., disks 216) within an arrayed storage device 102 such as the virtual RAID device 102 of FIGS. 2 and 3.

At block 400 of FIG. 4, a redistribution module 230 compiles workload information 232 regarding storage components in an arrayed storage device 102, such as disks 216 in virtual RAID device 102 of FIG. 2. The workload information 232 is stored in a memory 224 of the arrayed storage device 102. At block 402, redistribution module 230 accesses the compiled workload information 232. A predictive algorithm 234 executes at block 404 to analyze the workload information 232 and predict what data on any of the storage components within arrayed storage device 102 is high-access data that is likely to be heavily accessed in the future.

At block 406, redistribution module 230 monitors the utilization rate of arrayed storage device 102. The utilization rate can be monitored continuously or it can be monitored when high-access data has been predicted by predictive algorithm 234. As discussed above with respect to the FIG. 2 embodiment, the utilization rate generally indicates the rate at which arrayed storage device 102 is servicing host 104 I/O requests. At block 408, a determination is made that a least disruptive time has been reached based on a reduction in the overall utilization rate of arrayed storage device 102. During a least disruptive time, the redistribution module 230 redistributes or migrates data evenly across the storage component within the arrayed storage device 102 as indicated by block 410.

The method of FIG. 5 begins at block 500 with storing foreknowledge information 300 in a memory 224 of an arrayed storage device 102. Foreknowledge information 300 is information entered by a user that indicates that particular data stored in arrayed storage device 102 will be high-access data. At block 502, redistribution module 230 accesses the foreknowledge information 300 to determine what data stored in arrayed storage device 102 is high-access data. At block 504, the utilization rate of arrayed storage device 102 is monitored, and at block 506 a determination is made that a least disruptive time has been reached due to a reduction in the overall utilization rate of arrayed storage device 102. During a least disruptive time, the redistribution module 230 redistributes or migrates data evenly across the storage component within the arrayed storage device 102 as indicated by block 508.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A processor-readable medium comprising processor-executable instructions configured for:
    compiling workload information for storage components within a storage array;
    based on the workload information, predicting that at least one storage component contains high-access data; and
    redistributing the high-access data evenly across all storage components within the storage array.

2. A processor-readable medium as recited in claim 1, wherein the redistributing further comprises:
    locating the high-access data on the at least one storage component;
    removing high-access data from the at least one storage component; and
    storing high-access data evenly onto all storage components within the storage array.

3. A processor-readable medium as recited in claim 2, wherein the removing high-access data comprises removing all of the high-access data.

4. A processor-readable medium as recited in claim 2, wherein the removing high-access data comprises removing some of the high-access data.

5. A processor-readable medium as recited in claim 1, wherein the predicting further comprises:
    accessing the workload information; and
    executing a predictive algorithm that operates on the workload information.

6. A processor-readable medium as recited in claim 1, wherein the redistributing further comprises redistributing during a least disruptive time.

7. A processor-readable medium as recited in claim 6, comprising further processor-executable instructions configured for:
    monitoring a utilization rate of the storage array; and
    based on the utilization rate, determining the least disruptive time.

8. A processor-readable medium as recited in claim 1, wherein the compiling further comprises storing the workload information in a memory on the storage array.

9. A processor-readable medium as recited in claim 1, wherein the storage components are selected from a group of components comprising:
    magnetic disks;
    tapes;
    optical disks; and
    solid state disks.

10. A processor-readable medium comprising processor-executable instructions configured for:
    compiling workload information for storage components within a storage array;
    based on the workload information, determining least busy storage components and most busy storage components;
    determining that a new disk access is a random I/O (input/output); and
    using a least busy storage component to service the new disk access.

11. A processor-readable medium in a storage array having a plurality of storage components, the processor-readable medium comprising processor-executable instructions configured for:
    receiving foreknowledge information from a user, the foreknowledge information specifying data that will be heavily accessed at a future time;
    accessing the foreknowledge information to determine that high-access data is present on at least one storage component; and
    redistributing the high-access data evenly across all storage components within the storage array.

12. A processor-readable medium as recited in claim 11, wherein the redistributing further comprises:
    locating the high-access data on the at least one storage component;
    removing high-access data from the at least one storage component; and
    storing high-access data evenly onto all storage components within the storage array.

13. A processor-readable medium as recited in claim 12, wherein the removing high-access data comprises removing all of the high-access data.

14. A processor-readable medium as recited in claim 12, wherein the removing high-access data comprises removing some of the high-access data.

15. A processor-readable medium as recited in claim 11, comprising further processor-executable instructions configured for:
    prior to the accessing, storing the foreknowledge information in a memory on the storage array; and
    wherein the accessing comprises accessing the foreknowledge information from the memory.

16. A processor-readable medium as recited in claim 11, wherein the redistributing further comprises redistributing during a least disruptive time.

17. A processor-readable medium as recited in claim 16, comprising further processor-executable instructions configured for:
    monitoring a utilization rate of the storage array; and
    based on the utilization rate, determining the least disruptive time.

18. A processor-readable medium as recited in claim 11, wherein the storage components are selected from a group of components comprising:
    magnetic disks;
    tapes;
    optical disks; and
    solid state disks.

19. A processor-readable medium in an array of disks, the processor-readable medium comprising processor-executable instructions configured for:
    predicting that at least one disk contains high-access data; and redistributing the high-access data evenly across all disks within the array.

20. A processor-readable medium as recited in claim 19, wherein the predicting further comprises:
    compiling workload information that indicates the workload for each disk within the array; and
    executing a predictive algorithm that operates on the workload information.

21. A processor-readable medium as recited in claim 19, wherein the predicting further comprises accessing previously stored foreknowledge information that indicates data that is high-access data.

22. A processor-readable medium as recited in claim 19, wherein the redistributing further comprises:
    locating the high-access data on the at least one disk;
    removing high-access data from the at least one disk; and
    storing high-access data evenly onto all disks within the array of disks.

23. A processor-readable medium as recited in claim 19, wherein the redistributing further comprises redistributing during a least disruptive time.

24. A processor-readable medium as recited in claim 23, comprising further processor-executable instructions configured for:
    monitoring a utilization rate of the array of disks; and
    based on the utilization rate, determining the least disruptive time.

25. A method of distributing workload evenly across storage components in a storage array comprising:
    compiling workload information for each storage component within the storage array;
    based on the workload information, predicting that at least one storage component contains high-access data; and
    redistributing the high-access data evenly across all storage components within the storage array.

26. A method of distributing workload evenly across storage components in a storage array comprising:
    compiling workload information for each storage component within the storage array;
    based on the workload information, determining least busy storage components and most busy storage components;
    determining that a new disk access is a random I/O (input/output); and
    using a least busy storage component to service the new disk access.

27. A method of distributing workload evenly across storage components in a storage array comprising:
    receiving foreknowledge information from a user, the foreknowledge information specifying data that will be heavily accessed at a future time;
    accessing the foreknowledge information to determine that high-access data is present on at least one storage component; and
    redistributing the high-access data evenly across all storage components within the storage array.

28. A method of distributing workload evenly across disks in an array of disks comprising:
    predicting that at least one disk contains high-access data; and
    redistributing the high-access data evenly across all disks within the array.

29. A storage array comprising:
    two or more storage components;
    a redistribution module configured to access storage component workload information, and based on the workload information, to redistribute high-access data evenly across the two or more storage components; and
    a predictive algorithm configured as part of the redistribution module to analyze the workload information and predict the high-access data.

30. A storage array as recited in claim 29, wherein the two or more storage components are selected from a group of storage components comprising:
    magnetic disks;
    tapes;
    optical disks; and
    solid state disks.

31. A storage array comprising:
    a processor;
    two or more storage components;
    a memory having foreknowledge information stored therein;
    a redistribution module executable on the processor to access the memory, determine from the foreknowledge information which data on the two or more storage components is high-access data, and redistribute the high-access data evenly across the two or more storage components; and
    a predictive algorithm configured as part of the redistribution module to analyze the foreknowledge information and predict the high-access data.

32. A redundant array of independent disks comprising:
    two or more disks;
    a redistribution module configured to determine high-access data stored on a disk and to redistribute the high-access data evenly across the two or more disks; and
    a predictive algorithm configured as part of the redistribution module to analyze workload information from the disks and predict the high-access data.

33. A system comprising:
    a host computer;
    a virtual storage array to service data requests from the host computer, the virtual storage array having two or more storage components;
    a redistribution module executable on the virtual storage array to access workload information, and based on the workload information, to redistribute high-access data evenly across the two or more storage components; and
    a predictive algorithm configured as part of the redistribution module to analyze the workload information and predict the high-access data.

* * * * *